(12) United States Patent
Yang et al.

(10) Patent No.: US 12,455,084 B2
(45) Date of Patent: Oct. 28, 2025

(54) AIR SUPPLY DEVICE

(71) Applicants: Tianjin Chengjian University, Tianjin (CN); Xi'an University of Architecture and Technology, Shaanxi Province (CN)

(72) Inventors: Bin Yang, Tianjin (CN); Bin Zhou, Tianjin (CN); Changqing Yang, Tianjin (CN); Ran Gao, Tianjin (CN); Haiguo Yin, Tianjin (CN); Angui Li, Tianjin (CN)

(73) Assignees: Tianjin Chengjian University, Tianjin (CN); Xi'An University of Architecture and Technology, Shaanxi Province (CN)

( * ) Notice: Subject to any disclaimer, the term of this patent is extended or adjusted under 35 U.S.C. 154(b) by 954 days.

(21) Appl. No.: 17/528,545

(22) Filed: Nov. 17, 2021

(65) Prior Publication Data

US 2022/0221171 A1   Jul. 14, 2022

(30) Foreign Application Priority Data

Jan. 11, 2021 (CN) .......................... 202110031098.7

(51) Int. Cl.
*F24F 13/12* (2006.01)
*F24F 7/06* (2006.01)

(52) U.S. Cl.
CPC ................ *F24F 7/06* (2013.01); *F24F 13/12* (2013.01)

(58) Field of Classification Search
CPC ...... F24F 7/06; F24F 13/12; F24F 2013/0612; F24F 13/26

USPC .......................................... 454/236, 116, 163
See application file for complete search history.

(56) References Cited

U.S. PATENT DOCUMENTS 6,623,353 B1 * 9/2003 Akhtar ...................... F24F 1/01
454/261
2017/0266610 A1 * 9/2017 Sakikawa ................. F24F 3/14

FOREIGN PATENT DOCUMENTS

| CN | 111284300 A | * | 6/2020 | ......... B60H 1/00007 |
| DE | 102011114335 A1 | * | 3/2013 | ................ F24F 1/01 |
| KR | 1020200120891 | * | 9/2020 | ............ F24F 88/167 |

OTHER PUBLICATIONS

Wang, Wei, CN111284300 Translation.pdf, "Induction type vehicle overhead air conditioner outdoor unit", Jun. 2020, pp. 1-9.*

(Continued)

*Primary Examiner* — Avinash A Savani
*Assistant Examiner* — Ryan L Faulkner
(74) *Attorney, Agent, or Firm* — Frost Brown Todd LLP

(57) ABSTRACT

An air supply device is provided, which includes a housing with a cavity being formed therein. The air supply device further includes a partition plate, dividing the cavity of the housing into an upper cavity and a lower cavity; a flow equalizing plate, being vertically arranged in the upper cavity to divide the upper cavity into an air inlet cavity and a static pressure cavity, where a first air inlet that is communicated with the air inlet cavity being formed in the housing; an adjustable baffle plate, having a vertical height less than a vertical height of the lower cavity. The adjustable baffle plate divides the lower cavity into an induction cavity and a heat exchange cavity. The adjustable baffle plate and a top of the lower cavity form a first induced air opening. A heat exchanger is arranged in the heat exchange cavity.

4 Claims, 3 Drawing Sheets

(56) References Cited

OTHER PUBLICATIONS

Roth, Hans, DE102011114335 Translation.pdf, "Als Induktionsgerät ausgebildetes lufttechnisches Gerät sowie Verfahren zum Betreiben des Geräts", Mar. 2013, pp. 1-9.*

* cited by examiner

AIR SUPPLY DEVICE

CROSS REFERENCE TO RELATED APPLICATION

This application claims the benefit and priority of Chinese Patent Application No. 202110031098.7 entitled "Air Supply Device" filed with the Chinese Patent Office on Jan. 11, 2021, which is incorporated herein by reference in its entirety.

TECHNICAL FIELD

The present disclosure belongs to the field of air conditioning equipment, and particularly, relates to an air supply device.

BACKGROUND ART

With the development of science and technology, more and more work can be finished indoors. The time of modern people living and working in indoor environment has reached 80% to 90% of a whole day. Therefore, the quality of indoor environment directly affects people's health. An effective method for improving the quality of indoor air is to improve the circulation of indoor air, accelerate the discharge of indoor polluted air, and accelerate the injection of outdoor fresh air.

In the existing air supply devices, indoor recirculated air needs to be discharged from indoors through a separate exhaust outlet, enters an air-conditioning unit to mix with fresh air, and then, is fed into an air supply terminal device. In an actual using process, a plenum box needs to handle the fresh air and the indoor recirculated air simultaneously, so the plenum box with large capacity needs to be selected, resulting in an over-sized plenum box, and inconvenience in installation in an office building. The arrangement of an air duct leads to consumption of cooling energy of the indoor recirculated air during delivering and reduction of an energy-saving effect. On the other hand, the fresh air ratio can only be adjusted by adjusting the fresh air volume flow rate because the existing devices cannot change the recirculated air volume flow rate in an indoor air returning process in real time, which increases energy consumption of the whole system, reduces a utilization rate of the recirculated air, and cannot achieve an objective of saving energy.

SUMMARY

In view of the disadvantages in the prior art, the embodiments aim to provide an air supply device, which solves the problems that on one hand, the air supply device in the prior art, are inconvenient to install in an office building because a plenum box needs to be added when fresh air and indoor recirculated air are handled and a size of the plenum box is generally large, and on the other hand, a fresh air ratio can only be adjusted by adjusting the fresh air volume flow rate because the existing device cannot change a return air volume flow rate in an indoor air returning process in real time, which increases energy consumption of the whole system and reduces a utilization rate of the recirculated air.

In order to solve the above-mentioned technical problems, the present disclosure is implemented by adopting the following technical solutions.

An air supply device includes a housing with a cavity being formed therein. The air supply device further includes a partition plate, dividing the cavity of the housing into an upper cavity and a lower cavity; a flow equalizing plate, being vertically arranged in the upper cavity to divide the upper cavity into an air inlet cavity and a static pressure cavity, and a first air inlet that is communicated with the air inlet cavity being formed in the housing; an adjustable baffle plate, having a vertical height less than a vertical height of the lower cavity, wherein the adjustable baffle plate divides the lower cavity into an induction cavity and a heat exchange cavity; the adjustable baffle plate and a top of the lower cavity form a first induced air opening; a heat exchanger is arranged in the heat exchange cavity; a second air inlet that is communicated with the heat exchange cavity is formed in the housing; a first air outlet is formed in one side, far away from the upper cavity, of the induction cavity; and an air vent that is communicated with the static pressure cavity and the induction cavity is formed in the partition plate.

The adjustable baffle plate may include a fixed plate and a moving plate. The moving plate may be arranged at a position, close to the top of the lower cavity, of the fixed plate in a sliding manner. The fixed plate may be connected to a bottom of the lower cavity.

An arc chamfer may be arranged at a tail end of the moving plate. An arc of the arc chamfer may face the heat exchange cavity.

The air supply device may further include a flow equalizing plate, being vertically arranged in the upper cavity to divide the upper cavity into the air inlet cavity and the static pressure cavity. The first air inlet may be formed in the air inlet cavity. The static pressure device may be arranged in the static pressure cavity. The flow equalizing plate may be a porous plate, and a hole fraction of the porous plate may be 10% to 25%.

A second induced air opening may be formed at a position, close to a bottom surface of the lower cavity, of the fixed plate, and a height of the second induced air opening may be less than one third of a height of the induction cavity.

Spray nozzles may be formed in the air vent. An opening of the spray nozzles may face the induction cavity.

The air supply device may be arranged on a vertical wall with the induction cavity close to the vertical wall. A plurality of rotary shutters may be arranged on the first air outlet. A rotating angle of each of the plurality of rotary shutters may be 0° to 90°. A rotating direction of each of the plurality of rotating shutters may be away from the heat exchange cavity.

A design method for an adjustable plate includes the following steps:

S10, setting a diameter of the air vent to be $d_0$; assuming that a jet radius of an air jet ejected from the air vent and diverged to the adjustable baffle plate (13) is R and corresponding jet length is x, calculating the jet length x when the jet from the air vent is diverged to the adjustable baffle plate (13); and;

S20, determining a value of a height h of the first induced air opening (10) according to the jet length x when the jet from the air vent is diverged to the adjustable baffle plate (13).

The jet length x may be calculated by following expressions:

$$R = (R_0 + k \times x) \times e^{-a_1 \bar{x}_1}$$

$$\bar{x}_1 = \frac{x}{d_0}$$

$$R_0 = 2d_0$$

$$k = \tan\alpha$$

Where, $R_0$ is a radius of the air vent, $\alpha$ is a spread angle of the jet, $a_1$ is related to a confinement of the jet, $\overline{x_1}$ represents a dimensionless distance from a cross section to a polar point, $d_0$ is a diameter of the air vent, k is a constant, and R is the jet radius of the jet ejected from the air vent and diverged to the adjustable baffle plate.

The height h of the first induced air opening (10) may be less than the jet length x when the jet from the air vent may be diverged to the adjustable baffle plate (13).

Compared with the prior art, the embodiments have the following technical effects.

(I) In the air supply device, the cavity in the housing is divided into the upper cavity, the induction cavity, and the heat exchange cavity by arranging the partition plate and the adjustable baffle plate; the indoor recirculated air can enter the heat exchange cavity through the second air inlet by forming the heat exchange cavity, and the recirculated air directly enters the induction cavity after being handled under the action of the heat exchanger, which prevents the indoor recirculated air from being delivered to the first air inlet after passing through the exhaust outlet, mixing with the fresh air, and entering the air supply device, and reduces the energy consumption of the indoor recirculated air during delivering. At this case, only the fresh air passes through the first air inlet of the upper cavity, which greatly reduces an air volume flow rate of the air inlet cavity. Only the fresh air is subjected to static pressure treatment by the static pressure device and then enters the induction cavity through the air vent. By arranging the induction cavity, the fresh air and the indoor recirculated air handled by the heat exchanger reaches indoors through the air outlet after being fully mixed in the induction cavity. The air supply device is compact in structure and reduces energy loss. The objective of generating static pressure on the fresh air can be achieved by only arranging a small-capacity and small-size static pressure device in the upper cavity, so the air supply device is convenient to install, and an energy saving effect is greatly improved.

(II) In the air supply device, the adjustable baffle plate is arranged. A size of the first induced air opening can be adjusted by the adjustable moving plate, so as to further adjust an induced air volume flow rate passing through the first induced air opening to achieve an adjustment of the air volume flow rate at the first air outlet in real time according to actual indoor temperature, and achieve the objectives of saving energy and reducing consumption.

(III) In the design method of the adjustable baffle plate, a height of the first induced air opening is controlled to be less than a corresponding jet length of jet ejected from the air vent and diverged to the adjustable baffle plate, which can ensure that the jet that passes through the air vent cannot enter the heat exchange cavity, prevent the fresh air from mixing with indoor air through the first induced air opening, improve the induction efficiency of the air supply device, and further enhance work efficiency of the air supply device.

Figure 1:
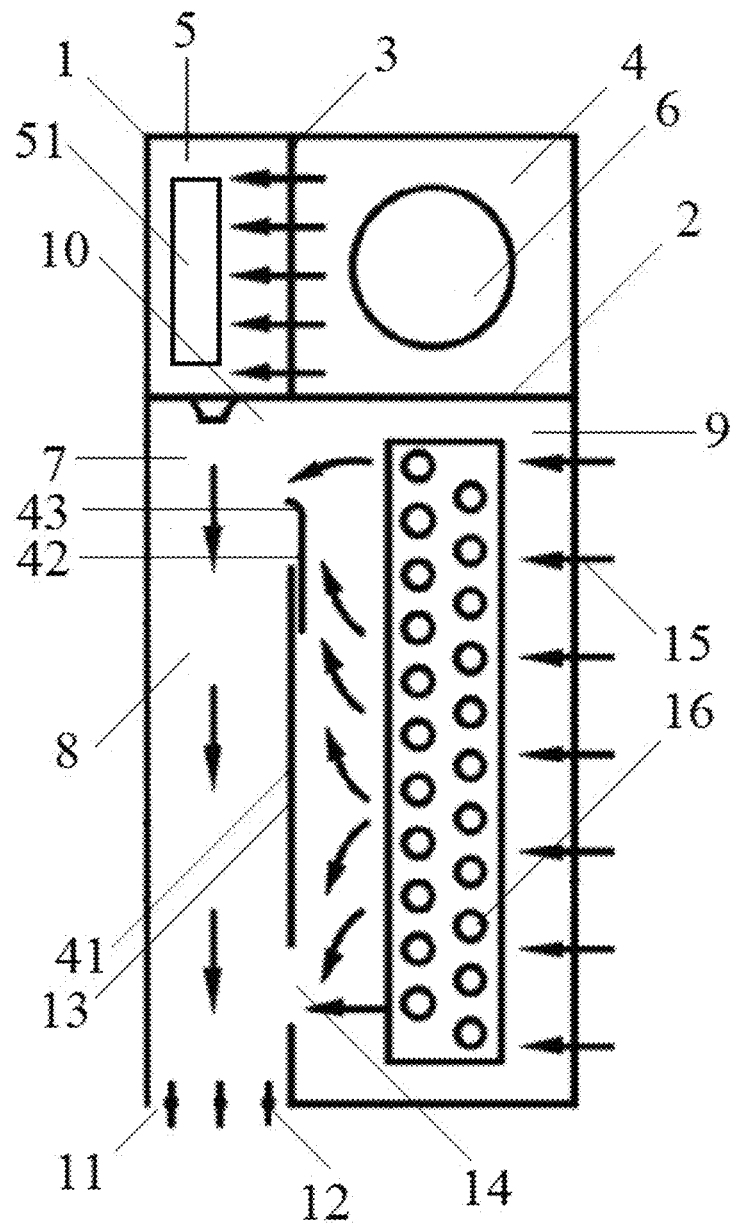
FIG. 1 is a schematic diagram of a whole body of an air supply device according to the present disclosure.

LIST OF THE REFERENCE CHARACTERS 1 housing; 2 partition plate; 3 porous plate; 4 air inlet cavity; 5 static pressure cavity; 6 first air inlet; 7 spray nozzle; 8 induction cavity; 9 heat exchange cavity; 10 first induced air opening; 11 air outlet; 12 rotary shutter; 13 adjustable baffle plate; 14 second induced air opening; 15 second air inlet; 16 heat exchanger; 41 fixed plate; 42 moving plate; and 43 arc chamfer.

The specific content of the present disclosure will be further explained and described below in detail in combination with embodiments.

DETAILED DESCRIPTION OF THE EMBODIMENTS

Specific embodiments of the present disclosure are given below. It should be noted that the present disclosure is not limited to the following specific embodiments, and all equivalent modifications made on the basis of the technical solutions of the present application fall within the scope of protection of the present disclosure.

Herein, fresh air refers to external fresh air entering an air inlet cavity from a first air inlet. According to different ventilation objectives in winter and summer, the fresh air in summer is cool air below room temperature, and the fresh air in winter is warm air above room temperature. Indoor recirculated air refers to an air volume flow rate obtained after the air volume flow rate supplied from an air outlet exchanges heat with indoor human bodies or buildings. Induced air refers to an air volume flow rate obtained after the indoor recirculated air enters a heat exchange cavity and passes through a heat exchanger. Induction rate refers to a passage rate of an air volume flow rate that has passed through a heat exchanger passing through a first induced air opening and a second induced air opening.

The used directional terms "upper", "lower", "horizontal", and "vertical" are consistent with the specific directions on the paper in the drawings of the specification or the corresponding directions of the space shown in the drawings.

Embodiment 1

Figure 2:
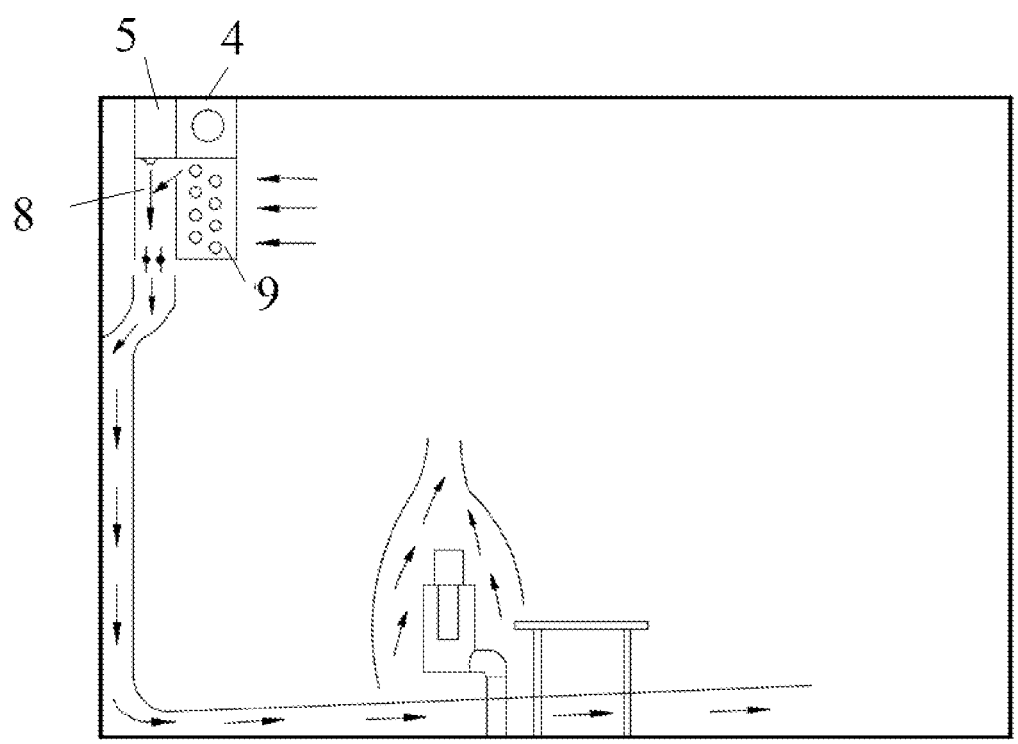
FIG. 2 is a schematic diagram of a structure of the air supply device according to the present disclosure when being installed in a chamber.

A wall-attachment ventilation air supply device, as shown in FIG. 1 to FIG. 2, includes a housing 1. A cavity is formed in the housing 1. The air supply device further includes: a partition plate 2, dividing the cavity of the housing 1 into an upper cavity and a lower cavity, a first air inlet 6 that is communicated with the upper cavity being formed in the housing 1, and a static pressure device being arranged in the upper cavity; an adjustable baffle plate 13, a vertical height of the adjustable baffle plate 13 being less than the vertical height of the lower cavity, and the adjustable baffle plate 13 dividing the lower cavity into an induction cavity 8 and a heat exchange cavity 9. The adjustable baffle plate 13 and a top of the lower cavity form a first induced air opening 10. A heat exchanger 16 is arranged in the heat exchange cavity 9. A second air inlet 15 that is communicated with the heat exchange cavity 9 is formed in the housing 1. A first air outlet 11 is formed in one side, far away from the upper cavity, of the induction cavity 8. An air vent that is communicated with the upper cavity and the induction cavity 8 is formed in the partition plate 2.

In the air supply device of the present embodiment, the cavity in the housing 1 is divided into the upper cavity, the induction cavity 8, and the heat exchange cavity 9 by arranging the partition plate 2 and the adjustable baffle plate 13. The indoor recirculated air can enter the heat exchange cavity 9 through the second air inlet 15 by arranging the heat exchange cavity 9, and the recirculated air directly enters the induction cavity 8 after being handled under the action of the heat exchanger, which prevents the indoor recirculated air from being delivered to the first air inlet 6 through an air pipe after passing through the exhaust outlet, mixing with the fresh air, entering the air supply device, thereby reducing the energy consumption of the indoor recirculated air during delivering. At this case, only the fresh air is supplied to the first air inlet 6, which greatly reduces an air volume that enters the upper cavity. The fresh air enters the induction cavity 8 through the air vent after being subjected to static pressure treatment by the static pressure device. By arranging the induction cavity 8, the fresh air and the indoor recirculated air after handled by the heat exchanger fully mix in the induction cavity 8 and then reach indoors through the air outlet 11. By arranging the adjustable baffle plate 13, on one hand, the fresh air can be prevented from entering the heat exchange cavity 9 to avoid mixing the fresh air and the indoor recirculated air in the heat exchange cavity 9 and disturbing a heat exchange process, in the heat exchange cavity 9, of the indoor recirculated air in the heat exchange cavity 9; on the other hand, the adjustable baffle plate 13 can form a first induced air opening 10 with the top of the lower cavity, so that the indoor recirculated air enters the induction cavity 8 through the first induced air opening 10, to mix with the fresh air, thereby improving the work efficiency of the air supply device. The air supply device of the present embodiment is compact in structure and reduces energy loss. The objective of increasing static pressure on the fresh air can be achieved by only arranging a small-capacity and small-size static pressure device in the upper cavity, so the air supply device is convenient to install and high in work efficiency, and an energy saving effect is greatly improved.

The heat exchanger in the present embodiment can be a cooling tube or a heating tube, so as to adapt to summer cooling and winter heating. Further, when cooling in summer, the heat exchanger is the cooling tube. The cold air is introduced from the first air inlet, the indoor recirculated air enters into the induction cavity 8 after being cooled by the cooling tube to mix with the fresh air input by spray nozzles 7, and enters indoors from the air outlet 11, so as to achieve the objective of cooling in summer. When heating in winter, the heat exchanger is the heating tube. The warm air is introduced from the first air inlet. The indoor recirculated air enters into the induction cavity 8 after being heated by the heating tube to mix with the fresh air input by the spray nozzles 7, and enters indoors from the air outlet 11, so as to achieve the objective of heating in winter.

As a preferred solution of the present embodiment, the adjustable baffle plate 13 includes a fixed plate 41 and a moving plate 42. The moving plate 42 is arranged at a position, close to the top of the lower cavity, of the fixed plate 41 in a sliding manner. The fixed plate 41 is connected to a bottom of the lower cavity.

The adjustable baffle plate 13 includes the fixed plate 41 and the moving plate 42. The size of the first induced air opening 10 can be adjusted in real time by adjusting the moving plate 42 to move up and down on the fixed plate 41, which further controls the induced air volume flow rate that passes through the first induced air opening 10 to change the induction rate and change the mixing ratio of the fresh air and the indoor recirculated air in the induction cavity 8, so as to adjust the type of the mixed air entering indoors from the air outlet 11 in real time according to actual indoor temperature, and achieve the objectives of saving energy and reducing consumption. Further, controllers are arranged on the moving plate 42 and the fixed plate 41, and the moving plate 42 is adjusted to move up and down on the fixed plate 41 via the controllers. The model number of the controllers in the present embodiment is ELMO GOLD Maestro.

As a preferred solution of the present embodiment, an arc chamfer is arranged at a tail end of the moving plate 42. An arc of the arc chamfer faces the heat exchange cavity 9.

The objective of arranging the arc chamfer is to induce induced air into the induction area 8, reduce local resistance loss of the induced air, and improve the induction rate, where the induced air refers to the air volume flow rate obtained after the indoor recirculated air passes through the heat exchanger, and the induction rate refers to the passage rate of the air volume flow rate that passes through the heat exchange cavity 9 passing the first induced air opening 10.

As a preferred solution of the present embodiment, the air supply device further includes a flow equalizing plate 3 which is vertically arranged in the upper cavity to divide the upper cavity into an air inlet cavity 4 and a static pressure cavity 5. The first air inlet 6 is formed in the air inlet cavity 4. The static pressure device is arranged in the static pressure cavity 5.

The objective of the flow equalizing plate 3 is to make the fresh air that passes through the first air inlet 6 enters the static pressure cavity 5 uniformly through the air inlet cavity 4. Further, the air volume that passes through the static pressure device uniformly enters the induction cavity 8 and uniformly reaches indoors from the air outlet 11, which improves the stability of the air supply device, and enhances the continuity and stability of indoor ventilation.

As a preferred solution of the present embodiment, the flow equalizing plate 3 is a porous plate. A hole fraction of the porous plate is 10% to 25%.

The objective of the hole fraction being 10% to 25% is to improve a flow equalizing function of the porous plate 3, and make the fresh air that passes through the first air inlet 6 enters the static pressure cavity uniformly, so as to further improve the air outlet uniformity of the air vent. In the present embodiment, the porous plate 3 with the hole fraction of 20% is selected.

As a preferred solution of the present embodiment, a second induced air outlet 14 is formed at the position, close to the bottom surface of the lower cavity, of the fixed plate 41.

The second induced air opening 14 is arranged to lighten a vortex generated at an included angle between a lower part of the adjustable baffle plate 13 and the housing 1, and improve the induction rate.

As a preferred solution of the present embodiment, a rotating angle of each of the rotary shutters 12 is 0° to 90°. A rotating direction of each of the rotary shutters 12 is away from the heat exchange cavity 9.

The rotary shutters 12 are arranged to adjust an air outlet volume of the air outlet to adjust an air volume of the air outlet in real time according to the actual indoor temperature, so as to achieve the objectives of saving energy and reducing consumption.

As a preferred solution of the present embodiment, a height of the second induced air opening 14 is less than one third of a height of the induction cavity 8, so as to prevent a large amount of induced air from entering an induction wall through the second induced air opening 14 to cause a poor mixing effect of the induced air and the fresh air.

As a preferred solution of the present embodiment, spray nozzles 7 are formed in the air vent. Openings of the spray nozzles 7 face the induction cavity 8.

The objective of the spray nozzles 7 is to improve a ventilation velocity of the air vent, and improve overall work efficiency of the air supply device.

As a preferred solution of the present embodiment, the air supply device is arranged on an indoor wall with the induction cavity 8 close to the vertical wall. Multiple rotary shutters 12 are arranged on the air outlet 11. The rotating angle of each of the multiple rotary shutters 12 is 0° to 90°. The rotating direction of each of the multiple rotary shutters 12 is away from the heat exchange cavity 9.

The objective of arranging the air supply device on the indoor wall and arranging the induction cavity 8 close to one side of the vertical wall is to achieve the objective of an attachment jet ventilation. Further, the rotating angle of each of the rotary shutters 12 is 0° to 90°, and the rotating direction of each of the rotary shutters 12 is away from the heat exchange cavity 9, so that the air volume of the air outlet 11 can produce a vertically downward jet, namely, the attachment jet, after being collided with the wall, and is delivered to a staff working area to improve air supply efficiency. The principle of the attached jet is that the jet of the air outlet 11 is affected by the wall, so the air supply jet close to the wall has high flow velocity and low static pressure, and the air supply jet away from the wall has high static pressure. The air supply jet is bent to the wall to achieve an attachment effect due to pressure difference, and the airflow of the air outlet 11 is delivered to a working area to the greatest extent, which ensures the freshness, the oxygen content, and the cleanliness of air in the working area, and meanwhile, ensures that temperature and a flow velocity of the air in the working area meet a requirement of thermal comfort. The objective of the attachment jet is achieved by adjusting the angle of each of the rotary shutters 12 because of different gravities of the airflow at the air outlet during cooling in summer and heating in winter.

A using process of the present embodiment is as follows.

When heating in winter, the fresh air (the warm air) enters the air inlet cavity 4 through the first air inlet 6, enters the static pressure cavity 5 through the porous plate 3, and is sprayed into the induction cavity 8 from the spray nozzles 7 after being handled by the static pressure device. The indoor recirculated air enters the heat exchange cavity 9 through the second air inlet 15 to obtain induced air under an action of the heating tube. The induced air enters the induction cavity 8 through the first induced air opening 10 and the second induced air opening 14. And then, the fresh air and the induced air reach indoors through the air outlet 11 after being fully mixed in the induction cavity 8, so as to achieve the objective of heating.

When cooling in summer, the fresh air (the cold air) enters the air inlet cavity 4 through the first air inlet 6, enters the static pressure cavity 5 through the porous plate 3, and is sprayed into the induction cavity 8 from the spray nozzles 7 after being handled by the static pressure device. The indoor recirculated air enters the heat exchange cavity 9 through the second air inlet 15 to obtain induced air under an action of the cooling tube. The induced air enters the induction cavity 8 through the first induced air opening 10 and the second induced air opening 14. And then, the fresh air and the induced air reach indoors through the air outlet 11 after being fully mixed in the induction cavity 8, so as to achieve the objective of cooling.

Embodiment 2

Figure 3:
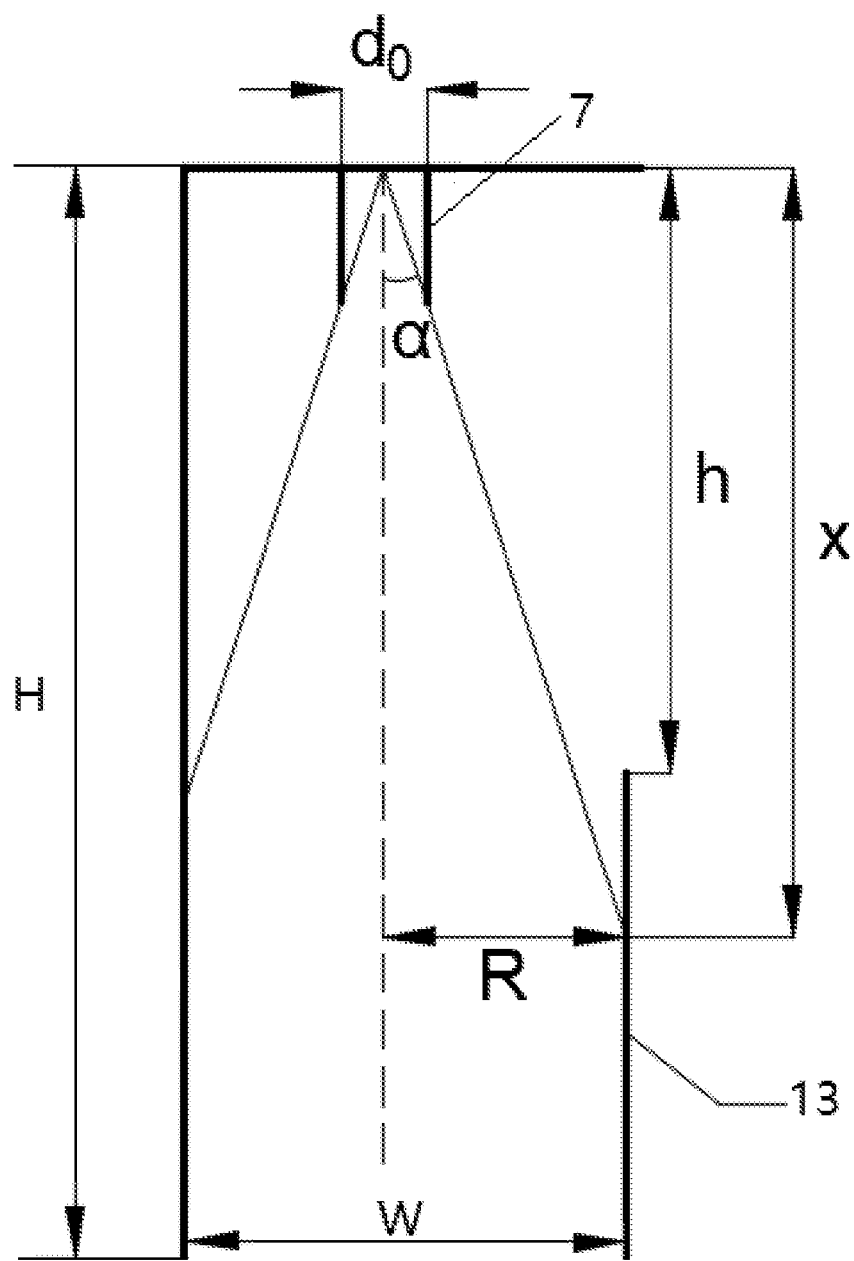
FIG. 3 is a geometric boundary schematic diagram of a jet at an air vent and an adjustable baffle plate according to the present disclosure.

A design method for the adjustable plate, as shown in FIG. 3, includes the following steps S10 to S20.

In step S10, a diameter of the air vent is set to be $d_0$; when a jet radius of the jet ejected from the air vent and diverged to the adjustable baffle plate (13) is R, and the corresponding jet length is x, the corresponding jet length x is calculated when the jet from the air vent is diverged to the adjustable baffle plate (13).

In step S20, a value of a height h of the first induced air opening (10) is determined according to the corresponding jet length x when the jet from the air vent is diverged to the adjustable baffle plate (13).

In the design method of the adjustable baffle plate of the present embodiment, the height of the first induced air opening is controlled to be less than the corresponding jet length of the jet ejected from the air vent and diverged to the adjustable baffle plate, which can prevent the air jet from entering the heat exchange cavity, prevent the fresh air from mixing with indoor recirculated air through the first induced air opening, and improve the induction efficiency of the air supply device, thereby further enhancing the work efficiency of the air supply device.

The jet length x is calculated by following expressions:

$$R = (R_0 + k \times x) \times e^{-a_1 \bar{x}_1}$$

$$\bar{x}_1 = \frac{x}{d_0}$$

$$R_0 = 2d_0$$

$$k = \tan\alpha$$

Where, $R_0$ is a radius of the air vent, $\alpha$ is a spread angle of the jet, $a_1$ is related to a confinement of the jet, $\bar{x}_1$ represents a dimensionless distance from a cross section to a polar point, $d_0$ is a diameter of the air vent, k is a constant, and R is the jet radius of the jet ejected from the air vent and diverged to the adjustable baffle plate.

In the present embodiment, the radius $R_0$ of the air vent is selected to be 4 mm The jet radius R of the jet ejected from the air vent and diverged to the adjustable baffle plate is selected to be 25 mm. The value of the spread angle of the jet is 14°.

The $a_1$ is determined according to the jet confinement expressed by dimensionless formula:

$$\frac{\sqrt{F_2}}{d_0}.$$

In the formula, $\sqrt{F_n}$ is a size dimension of a cross section of the induction cavity, which is not related to a shape of the cross section; $d_0$ is the diameter of the air vent, values of $a_1$ corresponding to jets of different jet confinements are shown in Table 1.

Where, $$\sqrt{F_n} = \frac{2(H*W)}{H+W},$$

H is the vertical height of the induction cavity, and W is a transverse width of the induction cavity. The value of H in the present embodiment is 400 mm. The air vent is formed in a center of the induction cavity, so that a value of W is 2 times of the jet width, and the value is 50 mm Therefore, $$\frac{\sqrt{F_n}}{d_0} = \frac{2*400*50}{(400+50)*8} = 11.1,$$

which is close to the jet confinement 10 in Table 1. Therefore, the value of $a_1$ in the present embodiment is 0.032.

TABLE 1

Values of $a_1$ corresponding to jets with different jet confinements

| $\frac{\sqrt{F_n}}{d_0}$ | 1 | 10 | 20 | 30 | 50 | 100 | 200 | 320 |
|---|---|---|---|---|---|---|---|---|
| $a_1$ | 0.32 | 0.032 | 0.016 | 0.011 | 0.0064 | 0.0032 | 0.0016 | 0.001 |

The above-mentioned parameters are substituted into the formula $$R = (R_0 + k \times x) \times e^{-a_1 x_1}, \text{ then}$$

$$0.025 = \left(0.004 + \tan\frac{\pi}{15}s_2\right) \times e^{-0.032 \times \frac{s_2}{0.008}},$$

so that the jet length x of 230 mm is obtained.

The height h of the first induced air opening 10 is less than the corresponding jet length x when the jet at the air vent is diverged to the adjustable baffle plate 4. Preferably, a guarantee coefficient of 0.75 to 0.9 can be selected in a specific case, i.e., the height h of the first induced air opening 10 is 0.75 to 0.9 time of the jet length x. In the present embodiment, the guarantee coefficient is set to be 0.9, and the height h of the first induced air opening 10 is set to be 207 mm, which can ensure a good induction effect.

What is claimed is:

1. An air supply device, comprising a housing with a cavity being formed therein, the air supply device further comprising: a partition plate, dividing the cavity of the housing into an upper cavity and a lower cavity, a first air inlet that is communicated with the upper cavity being formed in the housing, and a static pressure device being arranged in the upper cavity; an adjustable baffle plate, having a vertical height less than a vertical height of the lower cavity, wherein the adjustable baffle plate divides the lower cavity into an induction cavity and a heat exchange cavity; the adjustable baffle plate and a top of the lower cavity form a first induced air opening; a heat exchanger is arranged in the heat exchange cavity; a second air inlet that is communicated with the heat exchange cavity is formed in the housing; a first air outlet is formed in one side, away from the upper cavity, of the induction cavity; and an air vent that is communicated with the upper cavity and the induction cavity is formed in the partition plate; wherein the adjustable baffle plate comprises a fixed plate and a moving plate; the moving plate is arranged at a position, adjacent to the top of the lower cavity, of the fixed plate in a sliding manner; and the fixed plate is connected to a bottom of the lower cavity; wherein the air supply device is arranged on an vertical wall with the induction cavity adjacent to the vertical wall; a plurality of rotary shutters are arranged on the first air outlet; a rotating angle of each of the plurality of rotary shutters is 00 to 90°; and a rotating direction of each of the plurality of rotating shutters is away from the heat exchange cavity.

2. The air supply device according to claim 1, wherein an arc chamfer is arranged at a tail end of the moving plate; and an arc of the arc chamfer faces the heat exchange cavity.

3. The air supply device according to claim 1, wherein a second induced air opening is formed at a position, adjacent to a bottom surface of the lower cavity, of the fixed plate, and a height of the second induced air opening is less than one third of a height of the induction cavity.

4. The air supply device according to claim 1, wherein spray nozzles are arranged in the air vent; and openings of the spray nozzles face the induction cavity.

* * * * *